April 25, 1961 L. E. FRANKS ET AL 2,981,892

DELAY NETWORK

Filed March 22, 1960

INVENTORS L. E. FRANKS
P. V. PERLETTI
C. F. SIMONE

BY Ralph T. Holcomb
ATTORNEY

United States Patent Office 2,981,892

Patented Apr. 25, 1961

2,981,892

DELAY NETWORK

Lewis E. Franks, Short Hills, N.J., Paul V. Perletti, Portland, Oreg., and Carl F. Simone, Florham Park, N.J., assignors to Bell Telephone Laboratories, Incorporated, New York, N.Y., a corporation of New York Filed Mar. 22, 1960, Ser. No. 16,817

12 Claims. (Cl. 328—155)

This invention relates to wave transmission networks and more particularly to active delay networks of the sampled-data or switched type.

An object of the invention is to make the amplitude response of a delay network flat over a prescribed frequency range. A further object is to make the delay also flat. Other objects are to reduce the size, weight, and cost of delay networks, and to simplify the adjustment of the delay time.

The need for delay networks in transmission systems is steadily increasing. Conventional lumped-element delay lines require bulky, expensive inductors when considerable delay is required at very low frequencies.

The delay network of the present invention is an active structure which requires no inductors but includes a two-terminal switched element. The circuit comprises two transmission paths connected in parallel at their input ends and connected through a combining network at their output ends. One of the paths includes an amplifier having a feedback loop which comprises a second combining network. The loop also includes a series resistor and a switched shunt impedance branch connected at a point between the second combining network and either the output end or the input end of the amplifier. The shunt branch is made up of N capacitors, each of capacitance C, and a switch for connecting them into the circuit one after another, with a dwell time D, in a period of time T. The switch may be either mechanical or electronic. At least one of the paths includes an adjustable gain network, either an amplifier or an attenuator. The delay network also comprises a low-pass output filter and may require a low-pass input filter. In the preferred embodiment, the shunt branch includes a series resistor. The gain factors in the two paths are so chosen with respect to C, D, N, T, and the values of the resistors that the network has a substantially constant loss over the pass band $N/2T$ of the output filter. As a special case, the delay also may be made substantially constant over this band. The delay time may be changed by changing the switching period T, adjusting the gain factors and resistors, and substituting the appropriate output filter and input filter, if required.

Figure 1:
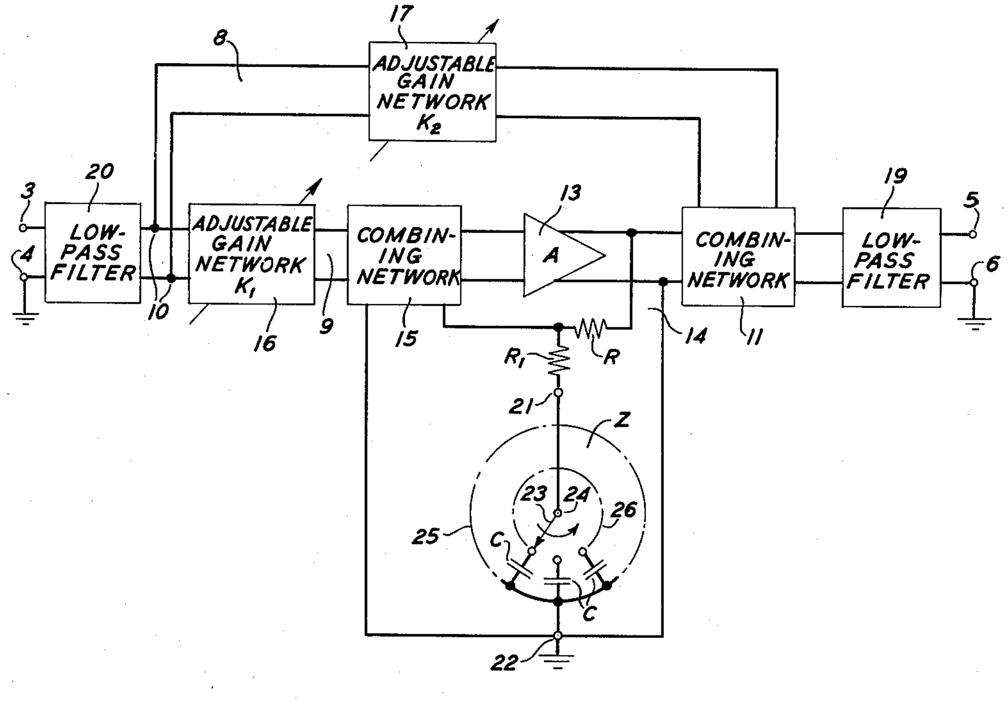
Figure 2:
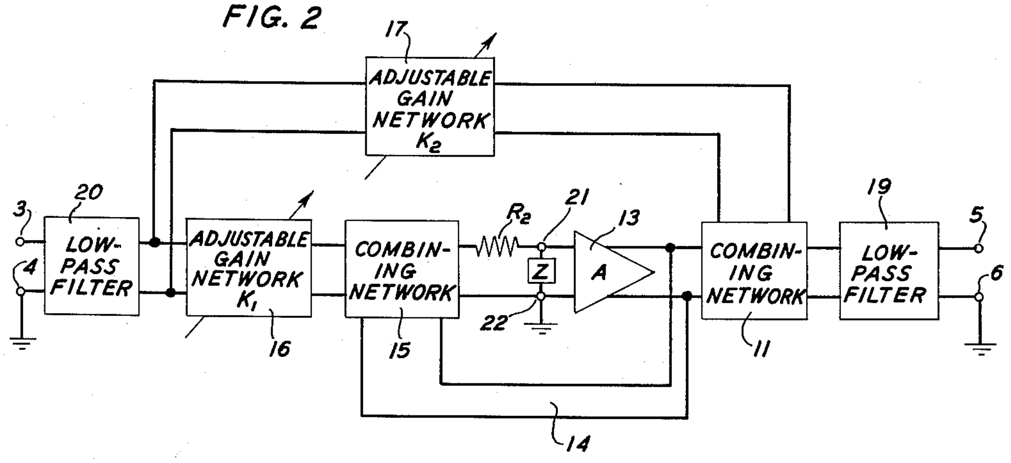

The nature of the invention and its various objects, features, and advantages will appear more fully in the following detailed description of the typical embodiments illustrated in the accompanying drawing, of which Fig. 1 is a schematic circuit of an active delay network in accordance with the invention; and Fig. 2 is a schematic circuit of an alternative form of the network of Fig. 1.

The delay network shown in Fig. 1 has a pair of input terminals 3—4 upon which the signal to be delayed may be impressed and a pair of output terminals 5—6 to which a suitable utilization circuit may be connected. The circuit comprises two transmission paths 8 and 9 connected in parallel at their input ends at the point 10 and connected at their output ends through a combining network 11. The path 9 includes an amplifier 13 which has an amplification factor A and a feedback loop 14 comprising a second combining network 15. As shown, the path 9 includes a network 16 with an adjustable gain factor $K_1$, and the path 8 a network 17 with an adjustable gain factor $K_2$. Each of the networks 16 and 17 may be either an amplifier or a passive attenuator. As explained below, one of these may be replaced by a straight-through connection. A low-pass filter 19 is connected at the output end, between the combining network 11 and the terminals 5—6. A similar low-pass filter is sometimes required at the input end, between the terminals 3—4 and the branching point 10. The terminals 4 and 6 may be grounded, as shown.

The feedback loop 14 includes a series resistor of value R and a shunt branch comprising a switched impedance Z. Usually, R is large compared to $R_0$ defined below. In the preferred embodiment, the shunt branch also includes a series resistor of value $R_1$. The impedance Z, between the terminals 21—22, is made up of N capacitors, each of value C, and a switch 23 adapted to connect the capacitors sequentially and repetitively in circuit between $R_1$ and the terminal 22, which may be grounded as shown. The switch 23 rotates around the axis 24 at a uniform speed in a period T. It is assumed that the switch 23 contacts the next capacitor C just as it releases the preceding one. Therefore, the dwell time D on each capacitor is $T/N$. Although only three capacitors C are shown, it is to be understood that a larger number may be used, as indicated by the broken-line arcs 25 and 26. Also, a suitable electronic switch may be substituted for the one shown.

The function of the low-pass output filter 19 is to suppress unwanted modulation products above $N/2T$. Therefore, its cut-off is generally placed at this frequency, but may be lower. The low-pass input filter 16, if required, usually has the same cut-off. However, it may be omitted if the input signal at the terminals 3—4 is limited to frequencies below $N/2T$. Each of these filters may be a simple passive network requiring only resistors and capacitors.

At frequencies below $N/2T$, it can be shown that the driving-point impedance of the switched element at the terminals 21—22 is given approximately by $$Z=R_0\left[\frac{1+e^{-j\omega T}}{1-e^{-j\omega T}}\right] \quad (1)$$

where $\omega$ is the radian frequency and $$R_0=\frac{ND^2}{2TC} \quad (2)$$

The transfer function, given by the ratio of the output voltage $V_2$ at the terminals 5—6 to the input voltage $V_1$ at the terminals 3—4, is $$\frac{V_2}{V_1}=K_2-K_1\left[\frac{R+R_1+Z}{R_1+Z}\right] \quad (3)$$

provided that the magnitude of the amplification factor A of the amplifier 13 is much larger than the ratio $(R+R_0+R_1)/R_0$. This transfer function has, in general, a periodic amplitude response and a periodic delay characteristic in $\omega$ with a period equal to $2\pi/T$. If we make $$\frac{K_2}{K_1}=\frac{R}{2R_1}+1 \quad (4)$$

the amplitude will be constant for frequencies below $N/2T$ and the delay $T_1$ will be $$T_1=\frac{T_1\dfrac{2R_0R_1}{R_0^2+R_1^2}}{1-\dfrac{R_1^2-R_0^2}{R_1^2+R_0^2}\cos\omega T} \qquad (5)$$

If, in addition, we make $$R_1=R_0 \qquad (6)$$

the delay will also be constant and equal to T for all frequencies below $N/2T$.

The resistor $R_1$ may be omitted and the amplitude and delay still kept constant provided $$A=\frac{R_0-R}{R_0} \qquad (7)$$

and $$\frac{K_2}{K_1}=\frac{R^2-R_0^2}{2RR_0} \qquad (8)$$

Fig. 2 shows a modification of the circuit of Fig. 1 in which the impedance Z is connected in the portion of the feedback loop 14 between the combining network 15 and the input end of the amplifier 13, instead of the output end. A series resistor $R_2$, usually large compared to $R_0$, is connected between Z and the network 15. The resistor $R_1$ in the shunt branch is omitted. In this circuit, for constant amplitude and delay, $$A=\frac{R_0-R_2}{R_0} \qquad (9)$$

and $$\frac{K_2}{K_1}=\frac{R_2-R_0}{2R_2} \qquad (10)$$

It will be noted that Conditions 4, 8, and 10 can be satisfied with both $K_1$ and $K_2$ less than unity. Therefore, the networks 16 and 17 need not contain active elements but may be passive attenuators. It is also seen that, in general, either one of these networks may be replaced by a straight-through connection, in which case unity is substituted for the corresponding gain factor $K_1$ or $K_2$ in the formulas.

It is to be understood that the above-described arrangements are only illustrative of the application of the principles of the invention. Numerous other arrangements may be devised by those skilled in the art without departing from the spirit and scope of the invention.

What is claimed is:

1. A delay network comprising two transmission paths connected together at both ends, means in one of the paths for adjusting the gain, and an amplifier in one of the paths, the amplifier having a feedback loop including a series resistor of value R and a shunt impedance branch, the shunt branch comprising a plurality of capacitors N in number, each of value C, and means for connecting the capacitors into circuit one after another in a period T with a dwell time D for each, the amplification factor of the amplifier and the gain factor of the gain-adjusting means being so chosen with respect to C, D, N, R, and T that the network has a substantially constant amplitude characteristic and a substantially constant delay T at all frequencies below $N/2T$.

2. A delay network comprising input terminals, output terminals, a first combining network, two transmission paths connected at one end to the input terminals and connected at their other ends to the first combining network, an amplifier with amplification factor A in the first of the paths, a second combining network in the first path between the amplifier and the input terminals, an adjustable gain network with a gain factor K in one of the paths, and a low-pass filter with a cut-off frequency $f$ between the first combining network and the output terminals, the amplifier having a feedback loop including the second combining network, the loop also including a series resistor of value R and a shunt impedance branch, the shunt branch including a number N of capacitors equal to at least three, each of value C, and means for connecting the capacitors into circuit sequentially and repetitively in a period of time T with a dwell time D for each capacitor, $f$ being not larger than $N/2T$ and A and K being so chosen with respect to C, D, N, R, and T that the delay network has a substantially constant amplitude characteristic and a substantially constant delay T below $f$.

3. A network in accordance with claim 2 in which the series resistor and the shunt branch are in the portion of the feedback loop between the second combining network and the output end of the amplifier.

4. A network in accordance with claim 3 in which the adjustable gain network is in the second of the paths and the following relationships are satisfied:

$$A=\frac{R_0-R}{R_0}$$

$$K=\frac{R^2-R_0^2}{2RR_0}$$

where $$R_0=\frac{ND^2}{2TC}$$

5. A network in accordance with claim 3 in which the adjustable gain network is in the first path and the following relationships are satisfied:

$$A=\frac{R_0-R}{R_0}$$

$$K=\frac{2RR_0}{R^2-R_0^2}$$

where $$R_0=\frac{ND^2}{2TC}$$

6. A network in accordance with claim 2 in which the series resistor and the shunt branch are in the portion of the feedback loop between the second combining network and the input end of the amplifier.

7. A network in accordance with claim 6 in which the adjustable gain network is in the second of the paths, the series resistor has a value $R_2$, and the following relationships are satisfied:

$$A=\frac{R_0-R_2}{R_0}$$

$$K=\frac{R_2-R_0}{2R_2}$$

where $$R_0=\frac{ND^2}{2TC}$$

8. A delay network comprising input terminals, output terminals, a first combining network, two transmission paths connected at one end to the input terminals and connected at their other ends to the first combining network, an amplifier with amplification factor A in the first of the paths, a second combining network in the first path between the amplifier and the input terminals, an adjustable gain network with a gain factor K in one of the paths, and a low-pass filter with a cut-off frequency $f$ between the first combining network and the output terminals, the amplifier having a feedback loop including the second combining network, the loop also including a series resistor of value R between the second combining network and the output end of the amplifier and a shunt impedance branch between the resistor and the second combining network, the shunt branch including a resistor of value $R_1$, a number N of capacitors, each of value C, and means for connecting the capacitors in series with the resistor $R_1$ one after another in a period T, each for a dwell time D, $f$ being not larger than $N/2T$ and A being much larger than $(R+R_1+R_0)/R_0$, where $$R_0=\frac{ND^2}{2TC}$$

9. A delay network in accordance with claim 8 in which the adjustable gain network is in the second of the paths and K has approximately the value $$K=\frac{R}{2R_1}+1$$

10. A delay network in accordance with claim 9 in which $$R_1=R_0$$

11. A network in accordance with claim 8 in which the adjustable gain network is in the first path and K has approximately the value $$K=\frac{2R_1}{R+2R_1}$$

12. A delay network in accordance with claim 11 in which $$R_1=R_0$$

No references cited.